(12) United States Patent
Budmiger

(10) Patent No.: US 7,661,323 B2
(45) Date of Patent: Feb. 16, 2010

(54) METHOD FOR DETERMINING WORKING POINT OF A MAGNETO-INDUCTIVE FLOW MEASURING DEVICE

(75) Inventor: Thomas Budmiger, Ettingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/988,280

(22) PCT Filed: May 11, 2006

(86) PCT No.: PCT/EP2006/062243

§ 371 (c)(1), (2), (4) Date: Apr. 2, 2009

(87) PCT Pub. No.: WO2007/003461

PCT Pub. Date: Jan. 11, 2007

(65) Prior Publication Data

US 2009/0199655 A1    Aug. 13, 2009

(30) Foreign Application Priority Data

Jul. 5, 2005   (DE) .................... 10 2005 031 665

(51) Int. Cl.
*G01F 1/58* (2006.01)
(52) U.S. Cl. .................................................. 73/861.11
(58) Field of Classification Search . 73/861.11–861.15; 219/123; 427/571; 324/253
See application file for complete search history.

(56) References Cited

U.S. PATENT DOCUMENTS

| 4,408,497 | A | 10/1983 | Suzuki |
| 4,910,041 | A * | 3/1990 | Yanagihara et al. ......... 427/571 |
| 6,834,555 | B2 * | 12/2004 | Brockhaus ............... 73/861.12 |
| 7,045,741 | B2 * | 5/2006 | Schmitt ....................... 219/123 |
| 7,194,918 | B2 * | 3/2007 | Brockhaus et al. ....... 73/861.12 |
| 2004/0118826 | A1 * | 6/2004 | Schmitt ....................... 219/123 |

FOREIGN PATENT DOCUMENTS

| DE | 199 17 268 A1 | 11/2000 |
| EP | 0 969 268 A1 | 1/2000 |
| EP | 1 460 394 A2 | 9/2004 |
| GB | 2 081 449 A | 2/1982 |
| JP | 11 223539 | 8/1999 |

* cited by examiner

*Primary Examiner*—Jewel Thompson
(74) *Attorney, Agent, or Firm*—Bacon & Thomas, PLLC

(57) ABSTRACT

A method for determining the working point of a magneto-inductive flow measuring device for detecting volume- or mass-flow of a medium flowing through a pipeline or measuring tube, wherein an alternating magnetic field produced by a coil arrangement is caused to pass through the pipeline or measuring tube, wherein a sensor-specific rise time ($t_r$) from reversal of the magnetic field up to reaching of an at least approximately constant magnetic field, as dependent on the particular magneto-inductive flow measuring device, is ascertained and stored, wherein a minimum measuring time ($t_M$) for providing a measured value of flow at the at least approximately constant magnetic field is determined, and wherein an optimized measuring period ($T_{opt}$) is determined as the sum of the sensor-specific rise time ($t_r$) and the minimum measuring time ($t_M$) and made available for operation of the flow measuring device.

9 Claims, 2 Drawing Sheets

METHOD FOR DETERMINING WORKING POINT OF A MAGNETO-INDUCTIVE FLOW MEASURING DEVICE

TECHNICAL FIELD

The invention relates to a method for determining the working point of a magneto-inductive flow measuring device for detecting volume- or mass-flow of a medium through a pipeline or measuring tube.

BACKGROUND DISCUSSION

A magneto-inductive flow measuring device includes, usually, the following components:
- a measuring tube, through which a medium flows essentially in the direction of the measuring tube axis;
- a magnet arrangement, which produces an alternating magnetic field passing through the measuring tube essentially perpendicularly to the measuring tube axis;
- two measuring electrodes positioned in the measuring tube on a connecting line directed essentially perpendicularly to the measuring tube axis and to the magnetic field; and
- a control/evaluation unit, which determines volume- or mass-flow of the medium through the measuring tube on the basis of the measurement voltage tapped on the measuring electrodes.

Magneto-inductive flow measuring devices make use of the principle of electrodynamic induction for measuring volumetric flow Charge carriers of the medium moved perpendicularly to a magnetic field induce a voltage in measuring electrodes likewise arranged essentially perpendicularly to the flow direction. This measurement voltage induced in the measuring electrodes is proportional to the flow velocity of the medium averaged over the cross section of the measuring tube. It is thus, proportional to volume flow rate. In the case of known density of the medium, it is, moreover, possible to derive also the mass flow rate of the medium flowing through the measuring tube. The measuring electrodes are usually galvanically or capacitively coupled with the medium.

Usually, control of the alternating magnetic field is accomplished using the coil current. In the ideal case, the magnetic field is proportional to the electrical current flowing in the coil arrangement, since the measuring, or field-frequency of the magneto-inductive flow measuring device (thus, the frequency, with which reversal of the alternating magnetic field occurs) is dependent, to a high degree, on the inductance of the coil arrangement. Due to manufacturing tolerances, the inductance of the coil arrangement is different from flow measuring device to flow measuring device. Moreover, there arise, during the reversal of the magnetic field, eddy currents in the pole shoes and in the cores of the coil arrangement. Due to the eddy currents, the coil current measured externally of the coil arrangement does not correspond to the sum of the current flowing in a coil and the current produced by the eddy currents. If the current measured externally of the coil arrangement is used as control variable, then, yes, the current is constant, but not the magnetic field. The actual rise time to reach a constant magnetic field is, as a result, a sensor-specific variable burdened with a relatively large measurement error.

The field frequency, or the measuring frequency, is fixed in the case of known magneto-inductive flow measuring devices. It is chosen so large, that even for the conceivably most unfavorable rise time, the measuring time for performing a measuring of volume- or mass-flow with the desired accuracy of measurement is sufficiently large. The disadvantage of this estimated solution is, however, clear: Since the field- or measuring-frequency is, in principle, sized greater than actually necessary, the number of measured values provided per unit of time is smaller than in the case of an optimally tuned measuring frequency. The end result of this limitation is reduced accuracy of measurement.

SUMMARY OF THE INVENTION

An object of the invention is to provide a method, with which measuring frequency or reversal frequency of the magnetic field is optimized.

The object is achieved by the features including an alternating magnetic field produced by a coil arrangement is caused to pass through a pipeline or measuring tube; a sensor-specific rise time from reversal of the magnetic field up to reaching of an at least approximately constant magnetic field, as dependent on the particular magneto-inductive flow measuring device, is ascertained and stored; a minimum measuring time for providing a measured value of flow at the at least approximately constant magnetic field is determined; and an optimized measuring frequency is determined from the sum of the sensor-specific rise time and the minimum measuring time and such optimized measuring frequency is made available for operation of the flow measuring device.

In an advantageous further development of the method of the invention, the coil current flowing through the coil arrangement is applied as control variable for the magnetic field. As already mentioned above, this solution is not optimal, because of the eddy currents arising in the pole shoes and in the cores of the magnetic arrangement. Therefore, an advantageous form of embodiment of the method of the invention provides that the coil current is controlled in such a manner that the sensor-dependent rise time following reversal of the magnetic field is minimized.

Especially advantageous in connection with the present invention is when the sensor-specific rise time is minimized by applying an overvoltage to the coil arrangement during reversal of the magnetic field for a predetermined reference time-span $t_{rev}$. Especially, the reference time-span $t_{rev}$ for the application of the overvoltage is successively so controlled, that, upon expiration of the reference time-span $t_{rev}$, the coil current, or the magnetic field, is at least approximately constant. Furthermore, it is provided that the overvoltage is so sized, that the electrical current flowing through the coil arrangement steadily decreases toward an essentially constant end value of electrical current following expiration of the reference time-span $t_{rev}$. A corresponding control of coil current is, moreover, known from EP 0 969 268 A1.

For further optimizing rise time, a further development of the method of the invention provides that, following expiration of the reference time-span $t_{ref}$, a counter voltage is applied to the coil arrangement for a predetermined time-span $t_{short}$ for approximately compensating the effect of the eddy currents induced in the coil arrangement during the reversal process. A corresponding embodiment is described in EP 1 460 394 A2.

Thus, it is essentially provided that the electromagnetic coil arrangement is short-circuited during the time-span $t_{short}$. Alternatively, the direction of the current flowing through the coil arrangement during the time-span $t_{short}$ is reversed. The ascertaining of the optimal time-span $t_{short}$ is done, preferably, by means of a trial and error process. The measured values ascertained during a reversal phase are applied for optimizing the time-span $t_{short}$ for the following reversal phase. Preferably, procedure is, in this case, as follows: The control/evaluation unit applies a counter voltage to the coil arrangement for a predetermined time-span $t_{short}$ during a first reversal process; subsequently, the control/evaluation unit registers a plurality of measured values of current within the predetermined time-span $t_{cont}$; for the case in which the end value of current is not reached upon expiration of the time-span $t_{short}$, the time-span $t_{short}$ is increased; for the case in which the end value of current is prematurely reached before expiration of the time-span $t_{short}$, the time-span $t_{short}$ is decreased.

Additionally, it is provided that a buffer time $t_{DELAY}$ is added to the sum of the optimized rise time and the minimum measuring time. Especially, the buffer time $t_{DELAY}$ is calculated in such a manner that reversal of the magnetic field occurs essentially synchronized with a later zero crossing of the operating frequency of the magneto-inductive flow measuring device. The operating frequency is, for example, the grid frequency.

BRIEF DESCRIPTION OF THE DRAWINGS

The invention will now be explained in greater detail on the basis of the appended drawings, the figures of which show as follows.

DETAILED DISCUSSION

Figure 1:
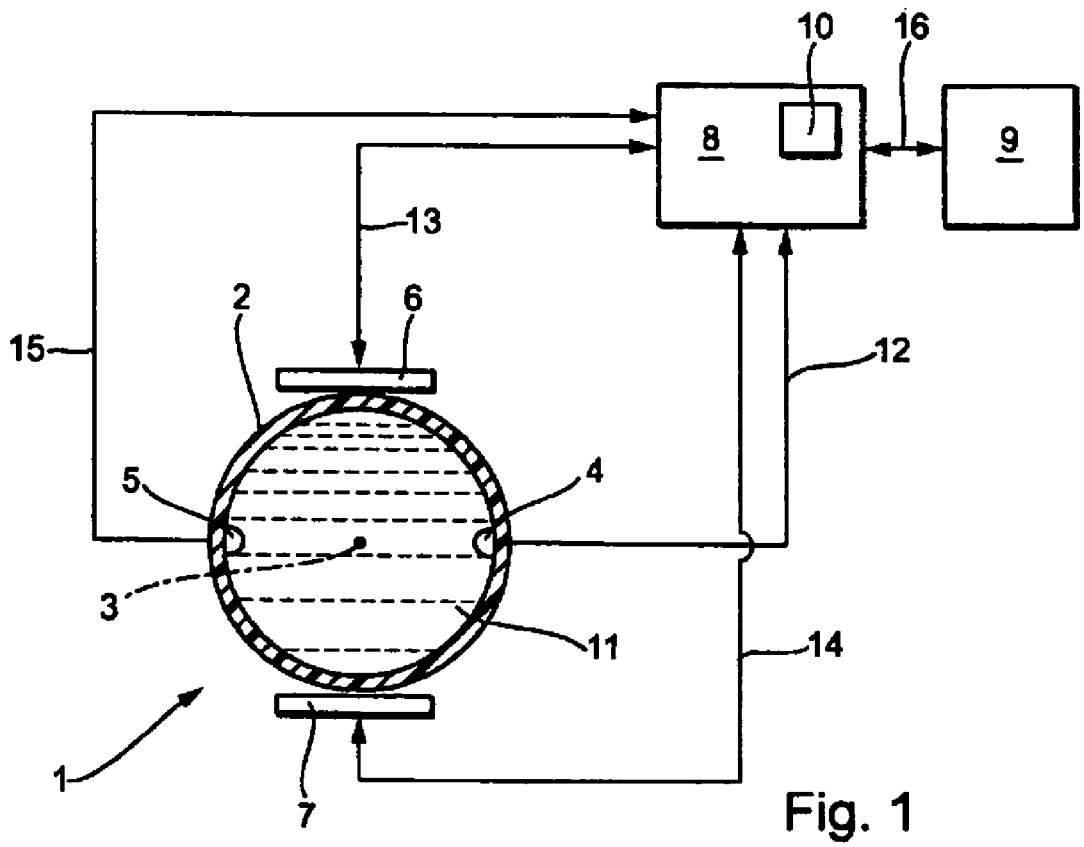
FIG. 1 is a schematic representation of a magneto-inductive flow measuring device, the working point of which is tuned according to the method of the invention.

FIG. 1 is a schematic drawing of an embodiment of a magneto-inductive flow measuring device 1, whose working point is tuned according to the method of the invention. Medium 11 flows through the measuring tube 2 in the direction of the measuring tube axis 3. Medium 11 is, at least to a small extent, electrically conductive. Measuring tube 2 is itself made of a non-conductive material, or it is coated on its inner surface with a non-conductive material.

Magnetic field B, which is directed perpendicularly to the flow direction of the medium 11, is produced via diametrally opposed coil arrangement 6, 7, or two electromagnets. Under the influence of the magnetic field B, charge carriers located in the medium 11 migrate, depending on polarity, to one of the two, oppositely poled, measuring electrodes 4, 5. The voltage established on the measuring electrodes 4, 5 is proportional to the flow velocity of the medium 11 averaged over the cross section of the measuring tube 2, i.e. the voltage is a measure for the volume flow of the medium 11 in the measuring tube 2. Measuring tube 2 is, moreover, connected via connecting elements, e.g. flanges, with a pipe system (not shown), through which the medium 11 flows.

Measuring electrodes 4, 5 are located in direct contact with medium 11; the coupling can, however, also be embodied capacitively, as already mentioned above.

Via connecting lines 12, 13, the measuring electrodes are connected with a control/evaluation unit 8. A connection between the coil arrangements 6, 7 and the control/evaluation unit 8 occurs via connecting lines 14, 15. Control/evaluation unit 8 is connected via connecting line 16 with an input/output unit 9. A memory unit 10 is assigned to the control/evaluation unit 8.

Figure 2:
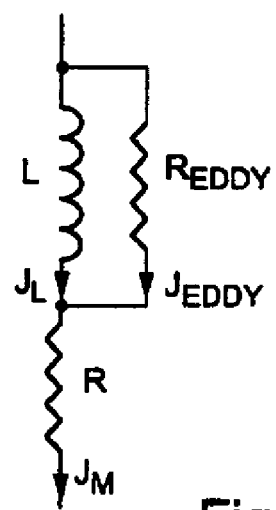
FIG. 2 an equivalent diagram of the coil arrangement.

In the case of an ideal magnet system, or in the case of an ideal coil arrangement 6, 7, the electrical current and the magnetic field B produced by the coil arrangement 6, 7 are mutually proportional. Under these conditions, the rise time $t_r$ to reach a constant magnetic field can be calculated exactly. The real case deviates from the ideal case: The coils of a coil arrangement 6, 7 used in magneto-inductive flow devices usually have coil cores and/or pole shoes. The control/evaluation unit 8 supplies the coil arrangement 6, 7 with electrical current in such a manner, that the magnetic field B periodically changes direction. Due to the eddy currents arising in the pole shoes and coil cores, the coil current $I_L$ in the two half periods of a reversal are not equal in amount. Rather, the current $I_M$ measured externally of the coil arrangement 6, 7 corresponds always to the sum current $I_M$, which is composed of the coil current $I_L$ and the eddy current $I_{EDDY}$. Since the current $I_M$ measured externally of the coil arrangement 6, 7 is always used by the control/evaluation unit as the control variable, the current $I_M$ is indeed constant, but not, however, the magnetic field B passing through the measuring tube 2. A corresponding equivalent circuit of the coil arrangement 6, 7 is shown in FIG. 2.

From the state of the art (especially compare EP 0 969 268 A1 and EP 1 460 394 A2 in this connection), solutions are given for how to reach a constant magnetic field as rapidly as possible. The content of these two patent applications is incorporated here by reference to form part of the present specification. To be noted is that the above-used reference symbols for the different time-spans relate directly, perhaps with translation, to reference symbols used in the two European patent applications.

Figure 3:
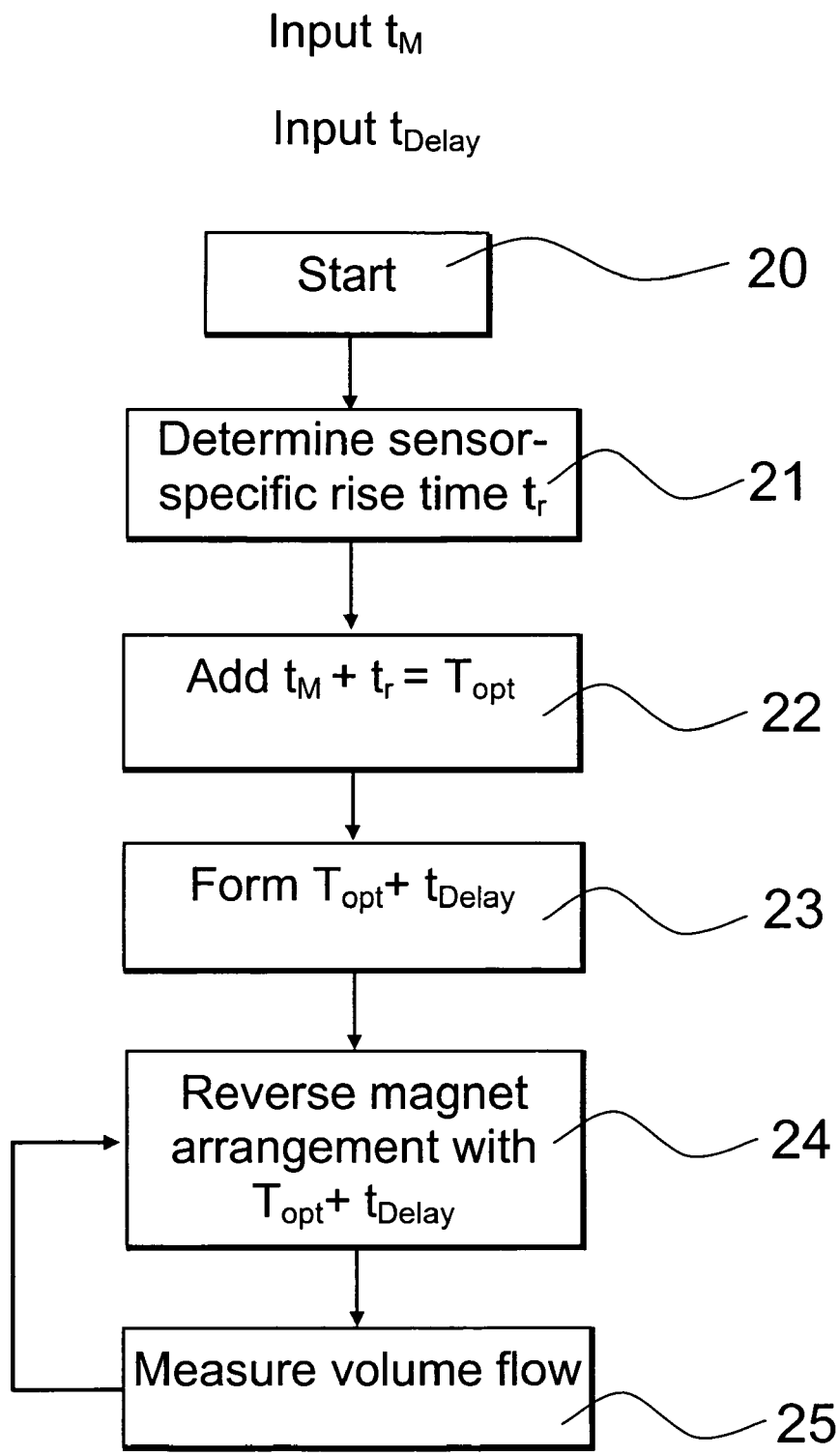
FIG. 3 is a flow diagram for explaining the method of the invention for tuning a magneto-inductive flow measuring device.

FIG. 3 shows a flow diagram for explaining the method of the invention for tuning a magneto-inductive flow measuring device 1. The desired measuring time $t_M$ and buffer time $t_{DELAY}$ are specified, or input. Both times, the measuring time $t_M$ and the buffer time $t_{DELAY}$, can also be calculated variables. Especially, they can be synchronized with external, influencing variables, such as the grid frequency or pulsation of the flow. The program starts at program point 20. At program point 21, the sensor-specific rise time $t_r$ is ascertained. For example, ascertainment of the rise time $t_r$ is accomplished by measuring the coil current $I_M$ (a measurement which is burdened with a relatively high measurement error), or by using one of the optimizing methods already mentioned above for assuring that the magnetic field reaches a constant value as rapidly as possible following a reversal.

At program point 22, the rise time $t_r$ and the input measuring time $t_M$ are added. The optimal measuring time $T_{opt}$ for operating the magneto-inductive flow measuring device 1 is determined on the basis of the sum. As a safety factor, yet a buffer time $t_{DELAY}$ is added at program point 23 to the sum formed at program point 22. The magnet arrangement 6, 7 is switched at program point 24 on the basis of the measuring time determined at program point 23. At point 25, the volume flow of the medium 1 through the measuring tube 2 is determined with an increased accuracy of measurement.

The invention claimed is:

1. A method for determining a working point of a magneto-inductive flow measuring device for detecting volume- or mass-flow of a medium through a pipeline or measuring tube, comprising the steps of:

producing an alternating magnetic field by a coil arrangement and causing to pass through the pipeline or measuring tube;

ascertaining and storing a sensor-specific rise time ($t_r$) from reversal of the magnetic field up to reaching of an at least approximately constant magnetic field, as dependent on the magneto-inductive flow measuring device;

determining a minimum measuring time ($t_M$) for providing a measured value of flow at the at least approximately constant magnetic field; and determining an optimized measuring period ($T_{opt}$) is determined as the sum of the sensor-specific rise time ($t_r$) and the minimum measuring time ($t_M$) and making it available for operation of the flow measuring device.

2. The method as claimed in claim 1, further comprising the step of:
applying a coil current ($I_M$) flowing through the coil arrangement as a control variable for the magnetic field.

3. The method as claimed in claim 2, wherein:
the coil current ($I_M$) is controlled in such a manner that the sensor-dependent rise time ($t_r$) following reversal of the magnetic field is minimized.

4. The method as claimed in claim 3, wherein:
the sensor-specific rise time ($t_r$) is minimized by applying for a predetermined reference time-span ($t_{rev}$), upon reversal of the magnetic field, an overvoltage to the coil arrangement.

5. The method as claimed in claim 4, wherein:
the reference time-span ($t_{rev}$) for applying the overvoltage is successively so controlled that, upon expiration of the sensor-specific rise time ($t_r$), the coil current ($I_M$), or the magnetic field is at least approximately constant.

6. The method as claimed in claim 4, wherein:
the overvoltage is so sized that the coil current ($I_M$) flowing through the coil arrangement falls steadily to an essentially constant end value of current following expiration of the reference time-span ($t_{rev}$).

7. The method as claimed in claim 4, further comprising the step of:
applying a countervoltage to the coil arrangement following expiration of the reference time-span ($t_{ref}$), a predetermined time-span ($t_{short}$), the countervoltage being so sized that the effect of eddy currents ($I_{EDDY}$) induced in the coil arrangement during the reversal is approximately compensated.

8. The method as claimed in claim 1, wherein:
a buffer time is added to the sum of optimized rise time ($t_r$) and minimum measuring time ($t_M$).

9. The method as claimed in claim 8, wherein:
the buffer time ($t_{DELAY}$) is calculated in such a manner that the reversal of the magnetic field occurs essentially synchronized with a later zero-crossing of the operating frequency.

* * * * *